US012342176B1

(12) United States Patent
Rao

(10) Patent No.: US 12,342,176 B1
(45) Date of Patent: Jun. 24, 2025

(54) COMMUNICATION UTILIZING RELIABLE TRANSPORT AND UNRELIABLE PROTOCOLS TO DEVICES

(71) Applicant: Sanjay K. Rao, Palo Alto, CA (US)

(72) Inventor: Sanjay K. Rao, Palo Alto, CA (US)

(73) Assignee: Sanjay K. Rao, Palo Alto, CA (US)

( * ) Notice: Subject to any disclaimer, the term of this patent is extended or adjusted under 35 U.S.C. 154(b) by 0 days.

(21) Appl. No.: 17/401,303

(22) Filed: Aug. 12, 2021

Related U.S. Application Data

(63) Continuation of application No. 16/824,004, filed on Mar. 19, 2020, now Pat. No. 11,129,030, which is a continuation of application No. 16/403,563, filed on May 5, 2019, now Pat. No. 10,638,327, which is a continuation of application No. 15/676,103, filed on Aug. 14, 2017, now Pat. No. 10,321,327, which is a continuation of application No. 14/811,546, filed on Jul. 28, 2015, now Pat. No. 9,736,699.

(51) Int. Cl.
*H04W 16/14* (2009.01)
*H04W 4/80* (2018.01)
*H04W 72/12* (2023.01)
*H04W 84/00* (2009.01)
*H04W 84/12* (2009.01)
*H04W 88/06* (2009.01)
*H04W 92/02* (2009.01)

(52) U.S. Cl.
CPC ............ *H04W 16/14* (2013.01); *H04W 4/80* (2018.02); *H04W 72/12* (2013.01); *H04W 84/005* (2013.01); *H04W 84/12* (2013.01); *H04W 88/06* (2013.01); *H04W 92/02* (2013.01)

(58) Field of Classification Search
CPC ....... H04W 16/14; H04W 4/80; H04W 28/08; H04W 84/005; H04W 84/12; H04W 88/06; H04W 92/02
USPC ......................................................... 455/552.1
See application file for complete search history.

(56) References Cited

U.S. PATENT DOCUMENTS

| | | | | |
|---|---|---|---|---|
| 6,708,213 | B1 * | 3/2004 | Bommaiah | H04L 67/1001 370/401 |
| 11,129,030 | B1 * | 9/2021 | Rao | H04W 16/14 |
| 2012/0158948 | A1 * | 6/2012 | Pang | H04L 65/80 709/224 |
| 2014/0140679 | A1 * | 5/2014 | Khader | H04N 21/43072 386/239 |
| 2014/0215536 | A1 * | 7/2014 | Maxwell | H04N 21/845 725/87 |

* cited by examiner

Primary Examiner — Ayodeji O Ayotunde
(74) Attorney, Agent, or Firm — FINNEGAN, HENDERSON, FARABOW, GARRETT & DUNNER LLP

(57) ABSTRACT

Mobile device applications may be enabled to function with greater reliability and performance with greater network visibility and control over the network infrastructure. A mobile device may be enabled with multiplexing across physical and virtual network interfaces. The mobile device may communicate with a server to access specific IP cell towers with wireless to wired offload capability or access points or define a routing table across with networks including wired and wireless hop switches. The connections may be virtualized to a universal interface.

14 Claims, 12 Drawing Sheets

COMMUNICATION UTILIZING RELIABLE TRANSPORT AND UNRELIABLE PROTOCOLS TO DEVICES

This application is a continuation of currently co-pending U.S. patent application Ser. No. 16/824,004 filed on Mar. 19, 2020, which is a continuation of U.S. patent application Ser. No. 16/403,563, filed on May 5, 2019, which is a continuation of U.S. patent application Ser. No. 15/676,103 filed on Aug. 14, 2017, which is a divisional of U.S. patent application Ser. No. 14/811,546 filed on Jul. 28, 2015, now U.S. Pat. No. 9,736,699, issued on Aug. 15, 2017; the present application incorporates by reference in its entirety the each of the afore applications mentioned.

BACKGROUND

In the prior art, communication networks are often single focused in terms of the networks they access at a time and in terms of the focus on the content that is transmitted. Communication often lacks a key integration between the application needs and the lower level communication technologies available. They lack an integrated view of the user. Further there lacks a unified approach to communication of multiple types of data.

In addition, wireless traffic is continually increasing with more conflicts on wireless local area network traffic. There is a need for multiple frequencies and more systems to appropriately to offload wireless traffic and use wireless networks with home appliances.

SUMMARY

It is an aspect of the present disclosure to provide a new level of application specific communication and control for device specific network interfaces. It is an aspect of the present disclosure to create a more efficient use of wireless spectrum by enabling multiple wired and wireless interfaces and intelligent use of the mix of various frequencies and bands to transmit and receive data. The mobile device and network boxes are enabled in the present disclosure to use multiple frequency bands simultaneously to intelligently transmit and receive data. Various bands may be enabled over time to further enable seamless and continuous coverage.

It is an aspect of the present disclosure to enable fully smart homes or offices configured with internet connectivity, access points and switches integrated into common appliances, sheet rock, ceilings, furniture or other devices such that connectivity is ubiquitous.

It is an aspect of the present disclosure to enable the use of multiple antennas both in the mobile device and cellular device, or network switch box.

It is an aspect of the present disclosure for various wireless devices to support millimeter wave wireless communication systems. In various instances higher frequencies may be used for wireless communication. Various antennas may be used simultaneously by a wireless access point or mobile devices to enable higher fidelity of the signal. It is an aspect of the present disclosure to enable wireless devices to operate at frequencies devices at lower frequencies 2.5 GHz and higher frequencies such as 30, 40, 70 GHz gigahertz all the way up to 300 GHz or more. In these scenarios short range communication may be enabled between devices and traffic may directly be offload to high speed wired networks. The various wireless devices described herein may contain one, two, three, four, eight or n number of wireless transmit and receive units, transceivers, or components. They may further contain large antenna arrays, fixed position antennas, or smaller antennas. The mix of antennas may be used for various levels of MIMO and various uses of simultaneous uplink and downlink across the antennas and across a plurality of frequency bands.

It is an aspect of the present disclosure to enable low latency networks of a millisecond or less and high throughput networks. Further, latency may be decreased by the use of predictive algorithms to enable users to reduce latency by automatically pre-streaming and downloading certain content.

It is an aspect of the present disclosure to enable wireless devices to use multiple bands including low frequency bands and higher frequency bands simultaneously in addition to long distance communication protocols and short distance communication protocols.

It is an aspect of the present disclosure to enable wideband communication and LAN.

It is further an aspect of the system to allow for social networking, professional networking, messaging, voice and video chat applications, and other programs to leverage multiple network resources of a wireless device or a cloud based server system to dynamically change the services and quality of service for the application.

It is an aspect of the system to include a mobile device inclusive of a smartphone, tablet, portable handheld device that is enabled with a touch screen or touch sensitive display, high definition display stylus, device and server based voice recognition, fingerprint scanner or sensor, GPS and WiFi location identification capabilities, operating system, access to an application store, gaming system, keyboard, touch screen keypad, processor, battery, still digital and video camera, front and back facing cameras, headphone port, microphone, USB, micro USB, USB-C, and wired and wireless network interfaces.

It is an aspect of the present disclosure to enable applications ranging from voice over IP (VoIP), media streaming, document sharing and collaboration to leverage the dynamic control of network resources as described herein.

It is an aspect of the present disclosure to enable virtual services to exist including holograms, holographic instantiation of a person or avatar for communication via social networks with the person.

It is an aspect of the present disclosure to enable user specific cloud information to be based on the users location by GPS and/or proximity to cellular or local networks.

It is further an aspect that cloud based storage network and software defined networking (SDN) devices, SDN server controllers, routers, switches, access points, multi-radio mobile devices, Internet of Things (IoT) devices, smart homes, appliances, thermostats, security systems and cameras, lights, garage systems, plumbing, televisions, microwaves, ovens, fridges, stovetops, and plumbing systems to leverage the communication system described here.

It is an aspect of the present disclosure that the communication and mobile devices disclosed herein may be enabled with a plurality of communication components, processors, systems on a chip, chipsets, and features. These wired communication aspects may include ethernet, power over ethernet, sound via a microphone jack, USB, microUSB, firewire, HDMI, optical and others. It is an aspect of the present disclosure that various wireless communication technologies may be enabled on the communication devices and servers including WiFi, 802.11a,b,c,g,n, ac,X (any variant), Bluetooth, Bluetooth LE, Zigbee, CMDA, TDMA, GPRS, WiMax, WiMax2, Edge, 2G, 3G, 4G, 5G, LTE (and all variants improvements), LTE bands, LTE Advanced, Bluetooth smart, Bluetooth version 4 and all versions, Bluetooth variants, short range frequency communication, long range frequency communication, USB, micro usb, Internet Protocol, TCP/IP, UDP, PNP, SIP, indoor location sensing, RFID, and NFC. Various network, and routing systems and protocols may also exist including BGP, MPLS, OpenFlow, multicast, unicast, and broadcast.

It is an aspect of the disclosure to enable efficient battery consumption. The devices may be enabled with wireless charging. The devices may further be enabled to selectively turn off radios and place such radios in wait states or low power listen states based on the network connectivity, application rules and application hierarchies.

It is an aspect of the present disclosure to enable virtual networks and overlay networks. It is further an aspect of the system to enable compute machines with virtualization including virtual machines that may be effectively transitioned from one computer, network switch, network device, or subsystem to another.

It is an aspect of the present disclosure to enable a virtual interface comprised of several physical interfaces from a single device and a virtual interface comprised of several physical interfaces from multiple devices.

It is an aspect of the present disclosure to enable a plurality of portable cellular or wireless local area network hotspots by using the connectivity of several mobile devices to create an on-demand network between devices and/or a virtualized network comprised of several mobile devices.

It is an aspect of the present disclosure to enable internet protocol (IP) based communication over traditional cellular networks and WiFi networks. The device may be enabled to receive an IPv4, IPv6, multiple IP addresses, or universal identifier as it roams across networks.

It is an aspect of the present disclosure to enable wireless devices, network switches, and communication devices with a plurality of ports and antennas to allow for simultaneously upload and download of data across multiple wireless radios, frequencies, and antennas for multiple input and multiple output (MIMO) communication, single user MIMO and multiuser MIMO with direction antenna support. It is an aspect that various communication devices may be enabled with dual, tri, quad, eight, and n by multiple inputs and out. Based on the desired upload and download characteristics, the antenna array usage may be configurable such that upload may be configured for 2 antenna access on a single radio and download may be configured for 4, 8, 16, or more antenna access on two, four, six or more separate radios or radio frequency components. In yet another aspect beamforming may be enabled to further communication.

It is an aspect of the present disclosure to enable sounding reference signals in a MIMO System. It is further an aspect to enable various MVNO, virtual network operates, and peering relationships between local WLAN providers and cellular providers to enable cellular connectivity on WLAN networks and WLAN connectivity for cellular devices for the purposes of offload.

The mobile devices and network switches described herein may be enabled with multiple communication bands to be fully universal in terms of connection to various carriers. These devices may be enabled to communicate via separate subsystems across lower frequency bands to higher frequency bands to be fully compatible with simultaneous transmit and receive across multiple cellular bands in addition to WLAN or WiFi. Additionally, the devices may be enabled to connect to multiple carriers to enable increased reliability across carriers. Further voice and data traffic may be split across different cellular carriers.

In yet another instance, traffic may be prioritized for session continuity, voice, video, multimedia, or by payment mechanisms. It is an aspect of the present disclosure to enable a variety of devices to communicate on a low latency basis and high quickly directly to each other. It is an aspect of the present disclosure to enable MIMO communication for multi-homed multi-connected devices.

It is an aspect of the present disclosure to provide connectivity for sensors, cars, traffic lights, subways, robots, mobile devices, home devices, network switches, wearable devices, smart devices, and smart homes.

It is an aspect of the present disclosure that wireless connectivity will be enabled for switches, mobile devices, sensors, clothing, appliances, cars, drones, pay phone booths, hotels, conferences, and a variety of other devices.

It is an aspect of the present disclosure to enable high speed wireless communication ranging from 1 Gbs to 10 Gbs to 100 Gbs+ or faster and also lower speed wireless communication that does not consume significant wireless spectrum or consumes no spectrum at all.

It is an aspect of the present disclosure to enable the use of predictive analytics and predictive algorithms to examine how individuals or devices move and their likely network needs, behaviors, or access requirements. In one embodiment, multiple streams between a mobile device and a remote server may be started simultaneously wherein a first stream is for the current consumed data, a second stream is a backup stream of key data components for reliability, and a third stream is a predictive stream of data likely to be requested by the mobile device. Additionally, data may be stored on the device of historical or predicted data to enable smoother communication. Streams may be virtualized at the transitory signal level and virtualized at the data stream IP level. Various devices may act as a local femtocell, microcell, or minicellular device. Older devices such as older tablet computers may act as access points, switches or cellular towers. Various IP interfaces may act as a virtualized IP interface with one IP addressed comprised of several separate IP addresses. Virtualization of transitory signal streams and data streams can be enabled across multiple devices such that devices may coordinate to act as a virtual network box, virtual access point, router, switch, server, webserver or as a local mesh network.

In yet another aspect of the disclosure, a communication device or network box may be enabled to communicate with multi antennas for transmission and multi antennas for downlink at the same time. Devices may use MIMO to send packets across multiple antennas for different uplink and downlink, time or frequency divided use, or simultaneous use. At a higher layer transmissions may be collapsed across network interfaces to create a universal or virtualized network interface comprised of several IP enabled interfaces. These IP enabled interfaces may in turn be comprised of several MIMO based transmit and receive units or components or modules. In certain embodiments, both the mobile device and network switch or access point must be enabled with multiple antennas and radios to make use of simultaneous transfer.

In yet another aspect, the antenna and radio configuration may software configurable by a controller on the mobile device, a local server, network server, or server connected to a cellular tower or other wireless access point. This can enable dynamic reconfiguration of the networking profile of the device for upload, download, streaming, peer to peer connections, WiFi Direct connections, streaming connections, or other requirements. Various security profiles may be enabled for a user, for an application for a device, for a network, or for a cloud network. These profiles can be used by SDN controllers and switches and servers for routing and packet forwarding decisions. They may further be used by the device to enable selective communication with a first network over a second network or a specific routing path based on the profile. As an example, an enterprise app may accept a packet from the outside and accept routing in its virtual machines from VM to VM whereas another flow may not allow VM to VM communication and may only allow physical network communication which ultimately ends up at the VM.

It is yet another aspect of the system to enable software defined networks to be created and controlled by a software implemented controller to be executed on a local or network server. The SDN system may communicate in conjunction with various firewalls, load balances, gateways, VPN servers, or other network boxes. The SDN system may dynamically overlay networks and virtual networks. Network switches, network boxes, and wireless devices may be enabled to be connected to multiple ports and networks simultaneously or sequentially.

It is yet another aspect to enable a network system of software and related components including servers, databases, event trackers and handler, routing processor system, discovery devices, network discovery protocols, MPLS, IP Sec, and network management systems.

It is yet another aspect to enable virtual LANs, virtual private networks, VPN servers, and devices to connect to each other. The devices may enable virtual networks and overlays between data centers, between virtual machines, between communication devices and servers, between wireless hops, between wireless access points, between wireless access points and routers or switches, and other network devices. In various instances switches may become virtually enabled for short periods.

In yet another aspect of the disclosure, network connectivity can be associated with a specific user versus a specific device or network. This enables the user to roam networks and locations but also devices for seamless session continuity. As an example, an individual may start video streaming on a smartphone and move into a TV room, use a voice recognition command to enable a TV and have the video stream continue to the TV in a living room and turn off from the smartphone. The system may enable the smartphone to initiate the connection to the TV directly to provide the initial video frames or to have the TV separately connect to a server to directly download the stream. The identification of the place of the stream may coordinated by the smartphone or by a server or controller.

It is an aspect of the disclosure to enable the cloud computing in conjunction with network computing to enable various network storage and information to be moved closer to a user based on a predictive algorithm.

It is an aspect of the present disclosure of the system to predict the behavior of a user to cache data for that user. As an example, a user using a streaming media application may be downloading a set of videos from a remote server. In this instance, an individual may finish a first episode of stream video series and may start a second episode. A remote server may understand the behavior of this user or behavior of users similar to the user via collaborative filtering to predict the content that the user would seek. As a result, the server may send to the device streams of data that the user is likely to enagage with. These streams may encompass just the first 30 seconds or minutes of the content or much more content.

BRIEF DESCRIPTION OF SEVERAL VIEWS OF THE DRAWING

The accompanying drawings, being incorporated in and forming a part of this specification, illustrate embodiments of the disclosure and, together with the description, serve to explain the principles of the present disclosure.

DETAILED DESCRIPTION

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to those embodiments. On the contrary, the disclosure is intended to cover alternatives, modifications and equivalents, which may be included within the spirit and scope of the disclosure as defined by the appended claims.

The present disclosure enables mobile devices to create several communication streams simultaneously with one or more remote servers to download, upload, and stream content across multiple network interfaces. These network interfaces can be collapsed to provide a virtual network interface to the device. This enables the higher layer applications to not have to change their specific network API calls. Alternatively, the interfaces need not be collapsed but can be leveraged with more data about the network capability.

Figure 1:
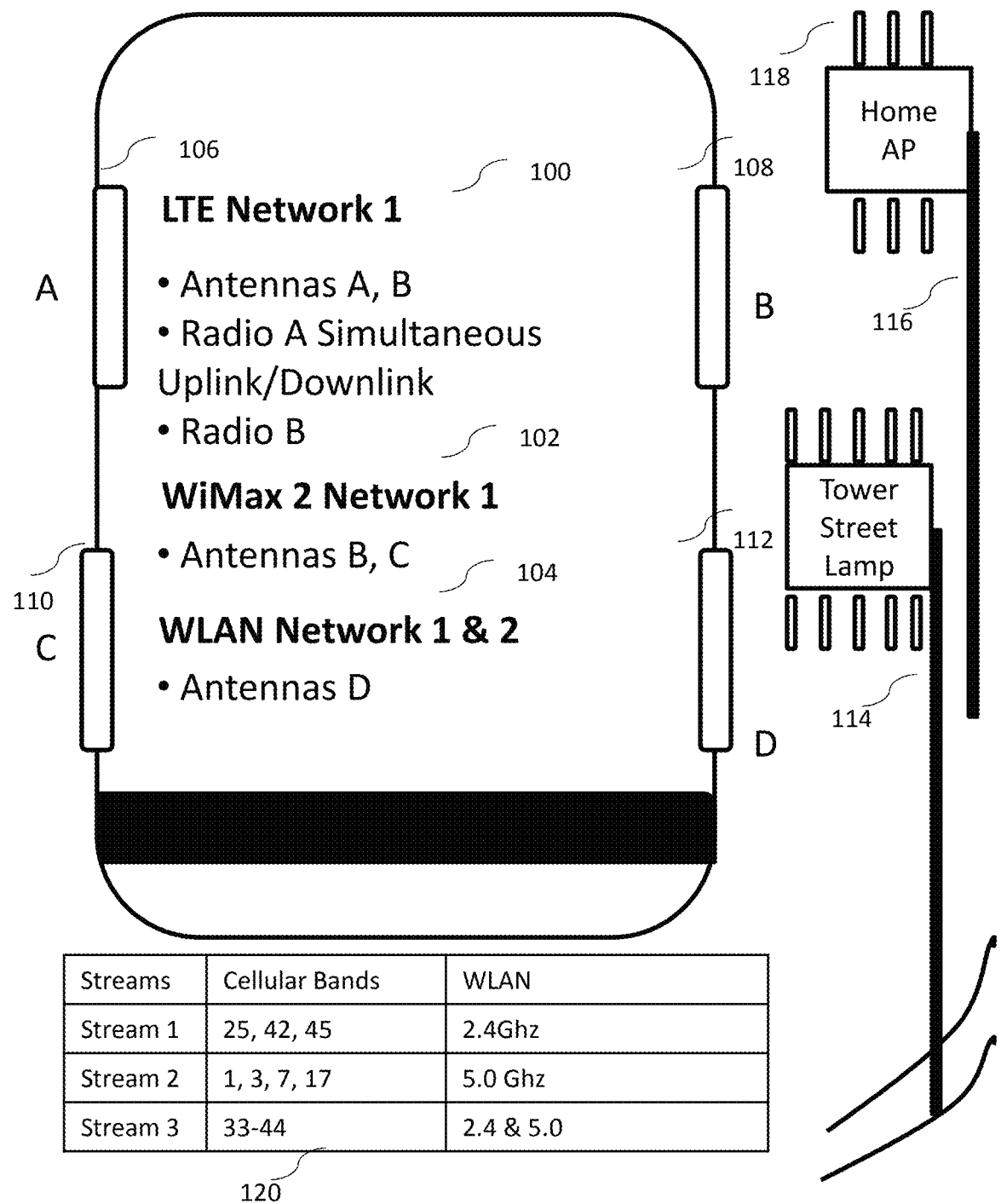
FIG. 1 shows a mobile device with multiple network interfaces, antennas, and WLAN components.

Referring now to FIG. 1, FIG. 1 depicts a mobile device with a plurality of antennas wireless transmit and receive units, radios 106, 108, 110, and 112, and network interfaces including 100, 102, and 104. Each of the network interfaces may be enabled with one or more IP addresses. The various network components may be integrated into components into a system on a chip or into a chipset. The device may be enabled with multiple cellular or multiple wireless local area network interfaces. The device 100 may be enabled to be connected with various distributed cellular or local WiFi access points and towers that contain large antenna arrays including 4×4 or 8×8. These devices may be enabled to communicate over larger distances or at Gigabit plus speeds for effective delivery of high definition multimedia content, medical content, and other applications. The towers 114 may be enabled to multiplex communications across a variety of devices and send traffic over a plurality of frequency bands to the mobile devices with mobile devices in turn being able to simultaneously communicate to the tower 114 across multiple frequency bands. This enables the mobile device to communicate more data quicker and more effectively.

Other towers or access points 116 may be available including those from homes which may join the network and these devices may be enabled with a plurality of antennas 118 like the tower 114. It is an aspect that multiplexing including spatial multiplexing and orthogonal frequency division multiplexing (OFDM) may be implemented in the system.

The mobile device may be enabled to aggregate carrier signals and WLAN communication across multiple frequency bands for the same signal stream as depicted in 120. In various instances data streams may be configured for wireless transmit and receive to signal streams. By leveraging multiple towers simultaneously a single data stream may be split at a wireless level into multiple signal streams at various frequency levels. These different streams may be able to communicate over multiple channels. They may further be enabled to have communication over multiple bands some with TDD and FDD duplex and division. The bands may also be limited to certain international regions or specific geographic regions within a zone. The wireless device may be universal in its ability to be used in various environments.

Figure 2:
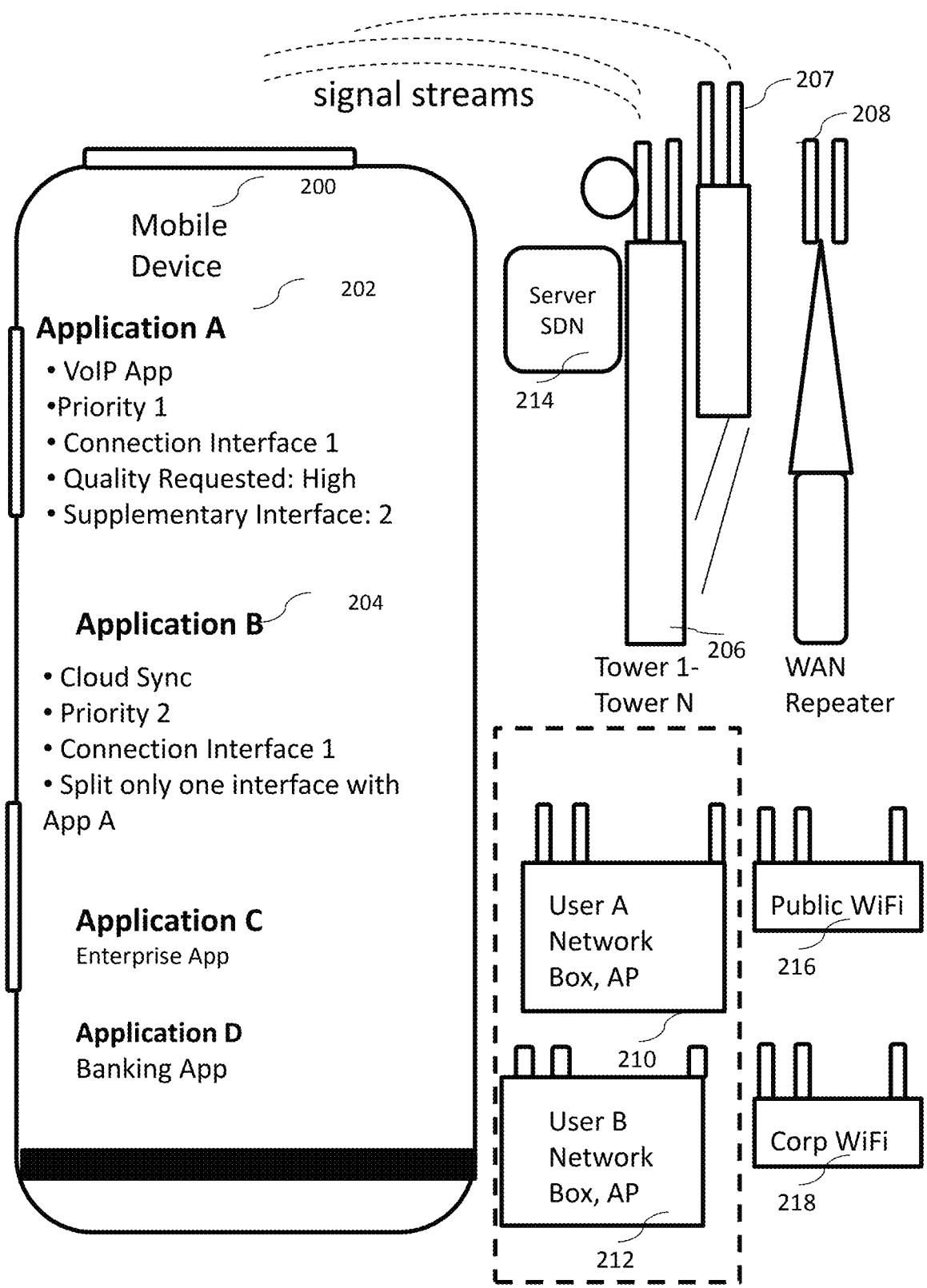
FIG. 2 shows multiple applications on a mobile device using selectively different network interfaces.

Referring now to FIG. 2, FIG. 2 depicts a mobile device 200 with multiple antennas, wireless transmit and receive modules, and applications 202, 204. In addition the mobile device is enabled to be connected to a plurality of cellular towers 206, 207 or a repeater tower 208 and/or a network AP communication 210.

Example: Network Capability APIs

These applications 202, 204 may request various network capabilities. It is aspect that various network APIs may be exposed to applications on mobile devices and on cloud based servers to control how applications behave relative to the network. These APIs may use a configuration file or table and include the ability to send files across multiple network interfaces, to leverage multiple networks only for peak usage, to conserve battery life by using lower powered networks, to enable buffering across a second network for certain types of media such as audio, to use lightweight requests over faster cellular networks using an unreliable transport protocol while simultaneously using a reliable transport for the full request, and others. In various instances, based on an observed network connectivity, data may be sent over low overhead protocols and over reliable transport protocols. In these instances, the processing of whether the data was received may be enabled using a cloud or local device. The cloud processing system may be effective and placing packets together across various resources.

Call Handoffs & Dual Homing: Still Referring to FIG. 2, the system enables for calls to be handed off between cellular and WiFi networks and enable session continuity across applications. For example, a call from the mobile device 200 can be transferred from a wireless local area network (WLAN) to a cellular or public network or vice versa. The system may expose a unifying connection interface to applications and other communication parties. These devices can use the universal identifier in spite of various network IP addresses changing. This IP address may be available, managed, and tracked by call gateways, a server, or a controller. In yet another instance, the device may be enabled to be connected to a first and second cellular network form at two different towers 206, 207 simultaneously to provide more reliable connections, to split voice and data traffic. In this instance one carrier's coverage may be optimal for text applications, while another carriers may be optimized for media coverage on a Long Term Evolution (LTE) network. This hybrid approach which is split based on the application type 202, 204 may enable greater wireless performance.

A connection from a mobile device to a cellular tower may also be from one device to two towers on the same network. The mobile device may use multiple radios and multiple communication bands to simultaneously connect to the different networks. A processor on the mobile device may enable the device to intelligently split traffic across the towers.

It is an aspect of the present disclosure to enable the cellular towers to provide widespread long range high distribution MIMO communication.

It is an aspect of the present disclosure to enable full duplex communication FDD, versus TDD and to dynamically integrate FDD and time division TDD communication methods across interfaces.

In yet another embodiment, since the devices may be enabled to switch effectively between networks, the present disclosure enables devices to pre configure and pre set up connections across various networks across various network interfaces to enable faster switching between the networks.

Example: Selective Synchronization

Still referring to FIG. 2, a document synchronization application 204 may be enabled to manage secure connectivity by selecting specific interfaces to connect to based on an application request or as default for an application. Increasingly, consumers are installing their workplace or enterprise applications on their device in a bring your own device system. These consumer devices may connect to public WiFi 216 and non-secured environments. These applications can be enabled to synchronize enterprise data selectively based on enterprise WiFi networks 218, cellular networks 207, 206, home networks 210, or public WiFi networks 216. Each network can be exposed with an aggregate security, cost, reliability rating and said ratings can be exposed to an application. For example, a banking application may request that it connects to its servers only on a cellular network as it may be more secured than a public free WiFi hotspot.

Example: Rules on Connectivity Synchronization

Still referring to FIG. 2, a more rich connectivity system may be enabled at the device, network level, or server controller level. Various rules may be set by these entities to determine how to interact with specific networks. As an example the device connectivity may include rules on when to use multiple networks or the likelihood to buffer streams based on movement data of the individual. These rules may be accessible via an API enabled for the application. The API and SDK associated with this may be available in the mobile device or in a cloud platform as a service or infrastructure as a service system.

Neighborhood Peering Relationship and Supplementary Wireless Coverage

Still referring to FIG. 2, it is an aspect of the present disclosure that WiFi signals may be available from various providers simultaneously. A server in conjunction with a service provider or on a distributed basis may contribute their WiFi signal to the neighborhood. Various parameters may be set on access control to their network. For example if an individual (UserA) is at the office from 9a to 6 pm and another individual (User B) in a nearby location is typically home during those hours, they may set up a peering relationship for full wireless connectivity or supplementary wireless coverage. In this instance A user may contribute their WiFi network to User B in the off hours. Alternatively, User A may set rules that if User B needs peak coverage then only User B can access User A. For example, User B's household may contain tens to hundreds of IP enabled wireless devices. User B may have a gaming console and a variety of devices that are downloading streaming video. At a certain point this may overload the WLAN and wired network of User B. It is in these instances the peering relationship may be enabled with User A. In such an instance, User B may send a request to User A's controller or to a local server or a service providers server. Alternatively, User B may be granted access to use a custom SSID or the full SSID of the User A's network. Billing, and bartering of the wireless information may be done at a later point or at the end of a time period.

Still referring to FIG. 2, various users network access points may be pulled together to create a microcellular tower. In this instance a User A's network access point and a User B's network access point may be under one SSID. Beyond the SSID coordination, these two access points may be synchronized to create a multi-antenna array, support for beamforming, and MIMO multiuser communication. In this instance if a User A is streaming a video outside they may use both access points to receive transmit and receive content from their own access point and that of their neighbors from the same or different remote servers. In various embodiments communication may be unidirectional or specifically directional from one network device to another mobile device or network device. Directional communication may be enabled for various devices that enable a location to be shared, including an indoor location and further stay in a fixed position.

The same application of localized cellular towers or access points may be used by carriers where a cellular tower my coordinate with a network access point or switch to create a multi-band multi frequency carrier network.

It is an aspect of the present disclosure to enable the controller to schedule transmission related activities for a specific device or set of devices.

Cellular Access on Private WLAN Networks

Still referring to FIG. 2, it is another aspect of the disclosure to enable cellular which traditional operate in licensed spectrum to operate in private unlicensed spectrum. Mobile Devices may use WiFi and WLAN protocols for a connection but the Access Point may be a cellular network's access point. Traditional WiFi networks may be half-duplex or split time on a time division multiplexing method. However, this may create situations in which cellular providers dominate the local WLAN. In these instances a local controller may provide a priority or compensation system to govern any changes from traditional wifi approaches. Alternatively, packets and requests may be identified with a tag or identifier that states what type of WiFi connection is being used on the physical layer. That is a cellular network that is attempting to operate on a wireless access layer using a form of 802.11 should identify in a heading whether it is a cellular or private network.

It is an aspect of the present disclosure to enable various interfaces or traffic to be tagged with a priority importance indicator.

Ownership Maps with WiFi Zones

Referring to FIG. 2, it is an aspect of the present disclosure that the rights to certain unlicensed airwaves may be governed by a separate server within the location. Traditionally, the FCC has not licensed certain frequencies such as 2.4 GHz and 5.0 GHz. In these areas where public carriers and private carriers may increasingly end in a desire to access the same physical airwaves, a protection and ownership server may be enabled. A location at a certain GPS location may broadcast that it is physically tied to the specific area. That is a User A owns a house at a location and therefore requests that its traffic be the preference at that location. The GPS location could further be verified by a physical mailing of the document in which an access code in a mailed document, such as by the US Postal Service, can verify the owner at that location and the access point that they have by a specific serial number for that access point. These ownership zones may be placed on mapping application.

Individuals at various home environments may place on a maps server or application their priority claim to the Wireless Zone and the rate at which they would like to offer access to their wireless network or access point. The rate need not be a straight monetary cost but instead may be a peering relationships (such as access to a hotspot network) or the like. Alternatively, the carrier that is providing an access point may provide such a service of a more public wireless access on a different frequency on the same device (e.x. 5.0 GHz versus 2.4 GHz).

File Split Upload

Still referring to FIG. 2, it is an aspect of the disclosure to enable a file, message, data, video stream or other content to be split for archival or transfer across a plurality of devices in a local area. A network switch or mobile device may need to upload several large files to a server. For example, a mobile device in a crowded environment such as a concert or sporting event may find that connectivity to cellular networks is overloaded and largely unreliable. The device may determine to send the files encrypted or with other security holders to a local device that is available on a local or hyper local wireless communication channel. Devices may determine which device has the best connectivity and use that device in whole to transfer the file. Alternatively, individual pieces may be transmitted to the server. Since the transport of this data may be out of sequence or non-critical in timing, TCP/IP may be used but a different protocol such as UDP or other unreliable transport protocol may be leveraged. The server may then wait to appropriately piece the packets together into a reliable data stream.

Still Referring to FIG. 2, a portable transportable network box or access point may be placed dynamically configured to accept Bluetooth or local WiFi traffic and then offload it to a wired network over PoE or Ethernet. These devices may be configured with a controller to route traffic to these hyperlocal channel instead of being routed to a supposed faster LTE network that is simply overcrowded.

Figure 3:
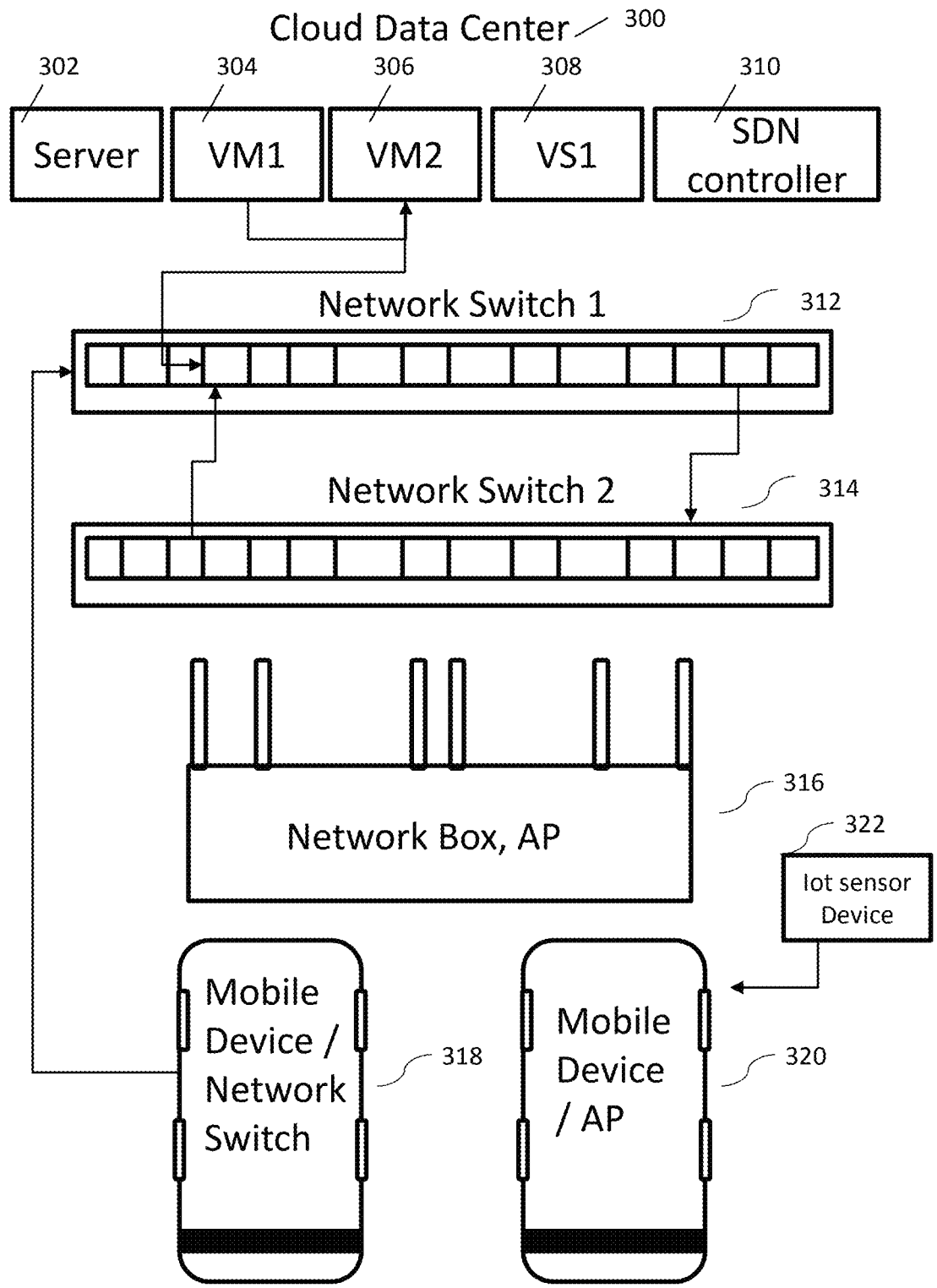
FIG. 3 shows network components including a server, virtual machine, SDN controller, network switch, access point, and mobile device.

Referring now to FIG. 3, FIG. 3 depicts a wireless software defined network that includes various cloud data centers 300, servers 302, virtual machines 304, 306, virtual switches 308, SDN controllers 310, physical network switches 312, 314, access points 316 and mobile device 318.

Software Defined Networks

It is an aspect of the disclosure to enable software defined networks (SDN) with controllers 310 capable of dynamically determine packet forwarding and routing for switches 312, 314. The SDN controller 310 may further enable direct switching within a physical device wherein two virtual machines exist in the same device. In this instance a virtual switch may be enabled for the machine to allow multitenant and secure containers. The SDN controller 310 may be enabled to receive reported crowdsourced network observations to alter routing behavior from network switches 312 or mobile devices 318. In another instance the SDN controller 310 may be enabled to route traffic based on the number of network interfaces available to a wireless device 318. Mobile devices that are less capable may be awarded a faster single path communication route or a direct path between an access point to a network switch 2 versus network switch 1. Whereas those devices that are more capable with multiple network interfaces may be enabled with multiple slower paths or a mix of fast and slow paths. Devices, applications, or specific requests may be prioritized based on owners, cost data, security needs, or other parameters for a varying quality of service (QoS) experience. It is an aspect of the present disclosure to enable QoS service above ubiquitous wireless communication.

Still referring to FIG. 3, FIG. 3 enables a controller to include mobile devices in the routing framework and use mobile devices as nodes in a packet switching network. For example traffic from mobile device 318 may bypass communication to the local network Access Point (AP) 316 and instead send data directly over a carrier network to a local network switch that then offloads the wireless communication to wired. Alternatively, mobile device 320 can use a shorter range protocol such as Bluetooth, light, or millimeter wavelength to send data to a second mobile device which in turn can send the data to the local network access point 316. Various sensor devices for example, sprinklers, plumbers, and other IoT devices or sensors 322 may forward packets to a mobile device 320 when in the vicinity and these packets may be synchronized selectively with a network server when the mobile device 320 is connected to a network and has sufficient or cheap bandwidth. Various IoT and sensor devices may use non reliable transmit and receive protocols in addition to TCP/IP for session uncritical data.

Figure 4:
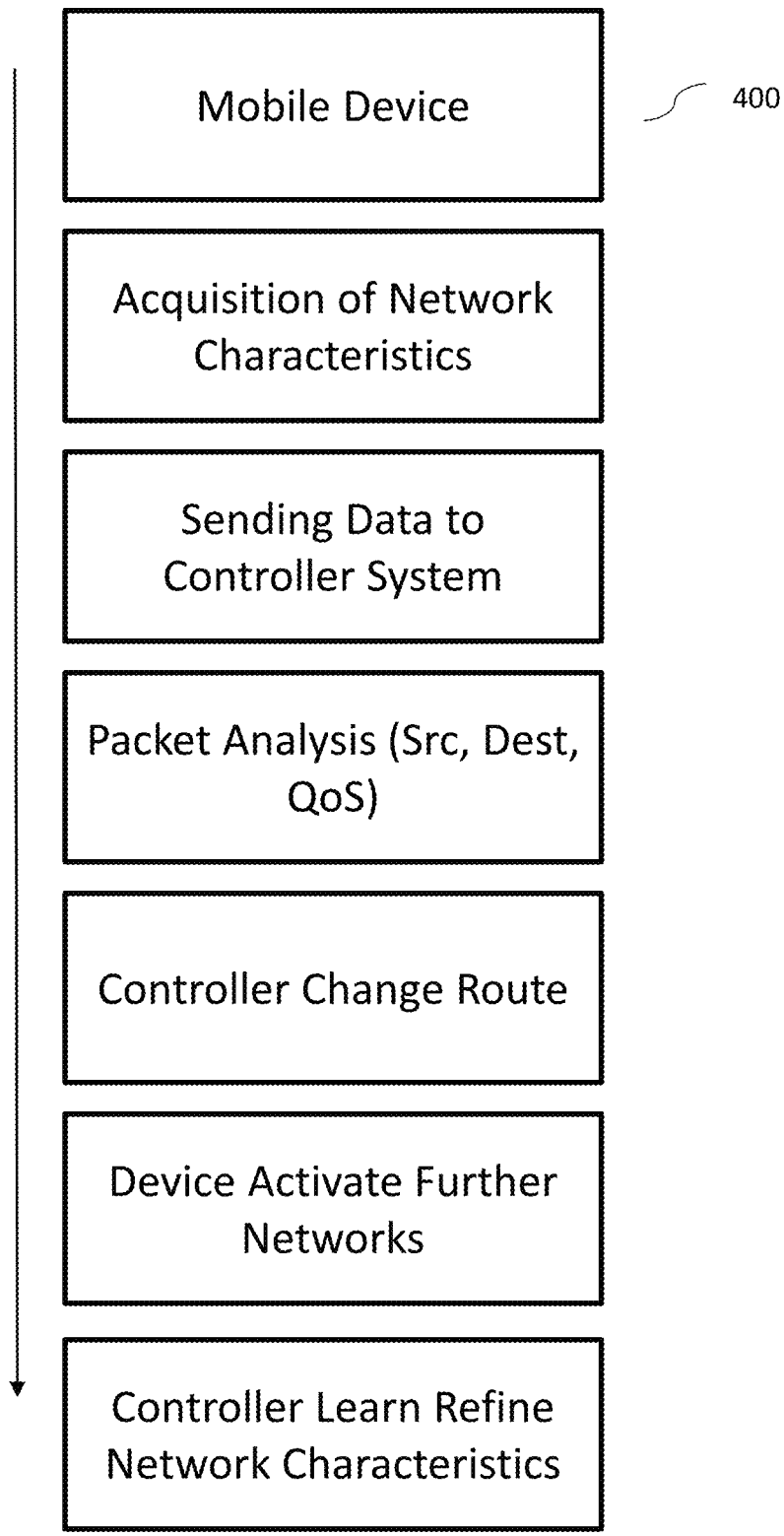
FIG. 4 shows an SDN controller learning method based on data from a mobile device and the network.

Referring now to FIG. 4, FIG. 4 discloses a sequence or simultaneous set of activities 400 involving a mobile device and SDN controller 310. A plurality of mobile devices may observe various network characteristics and periodically send such reporting data to a network controller. These reporting of information may function as an opt-in system or a default system. The mobile device may store network characteristic data to be cached and sent to the server or controller on a certain interval. The server or SDN controller may be based at a carrier, enterprise, data center, wireless network, or other location. Multiple controllers may exist in various servers with a hierarchy established between the servers.

Still referring to FIG. 4, the mobile device, server, cloud or controller may perform packet analysis on the transmissions looking at various factors including source and destination data. The controller may change the forwarding or routing parameters based on this reported crowd sourced data from the devices, learn from the network changes, or create predictive rules for the changes.

It is an aspect of the present disclosure to enable asynchronous communication between the appliances to enable the devices to communicate data for which there may be a lower priority to a cloud monitoring system or server system.

Figure 5:
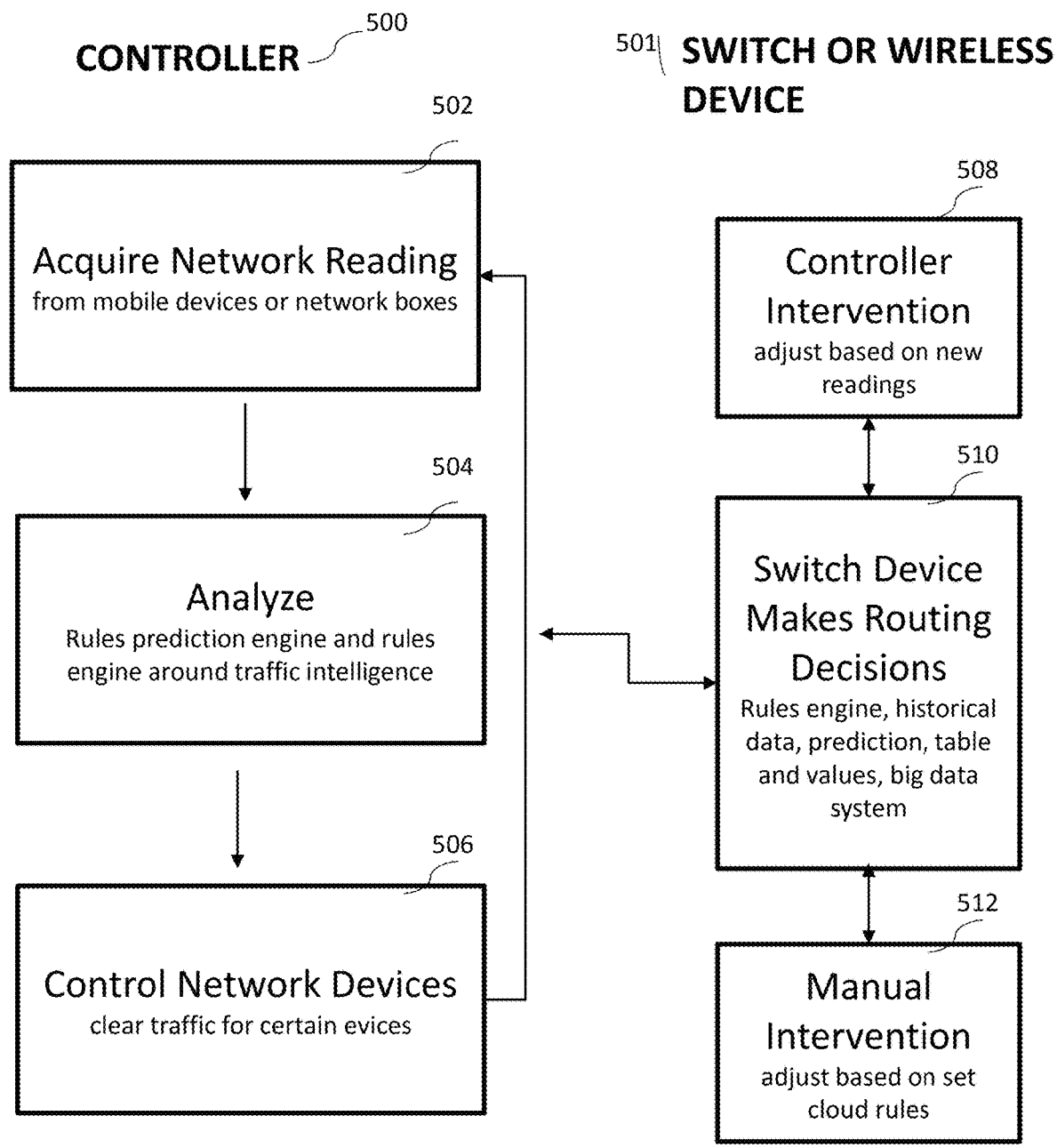
FIG. 5 shows an SDN controller changing the behavior of a network switch and updating its learning system.

Now referring to FIG. 5, FIG. 5 depicts an SDN controller 500 tracking network activity with oversight of one or more communications devices 501 such as network switch or wireless device. The SDN controller acquires various readings from mobile devices which serve as end points, mid points, receiving agents, reporting agents, security agents or in other modes. The SDN controller users a server or a cloud compute or processing service to analyze network flows in real time, historically, or based on behavior to create dynamic routing engines and protocols on time, network, stream, type of stream, quality of service, or device specific basis. In this case, each device may be enabled with a specific routing approach based on one or more controllers.

As an example, an enterprise application may be enabled to have a specific routing table to first route all data to a specific front-end server or gateway device and then subsequently to a specified network. Alternatively a banking application may want to keep source destination information private and seek to only connect when on a user's home network or on a hyper local network such as Bluetooth to an ATM or on a secured cellular network. These manual rules 512 may be set via an Software Development Kit (SDK) or set of Application Programming Interfaces (APIs). The controller or server itself may host specific rules for applications. In an enterprise context a local controller may be enabled with a rules engine to switch traffic out of public networks and onto private networks based on an application tag such as banking, corporate, or other. The rules based system may connect to an identity management system, mobile device management (MDM) system, or other IT server to set specific priority interfaces, security requirements, and quality of service (QoS) information.

Crowdsourced Connectivity Data

Still referring to FIG. 5, the quality of connectivity data may be crowdsourced from a plurality of wireless devices 502. Devices may send to a controller 500 reporting data of their experienced connectivity across dimensions such as speed, packet loss, number of network interfaces available, owners, SSID information, and further context.

Still referring to FIG. 5, a cellular, network or local controller or a controller embedded in the mobile device may track certain parameters of the network and make decisions on when to use the network or not. For example, the table may contain data including the cost of a connection in relation to the allotment of data a customer has on their wireless account or in relation to how much they have left and their likelihood of using all the data before the end of the period. Alternatively, if a large file needs to be sent over the network to a server, the controller may determine to wait to send the network till a new network is available that is lower cost or of faster reliability. Alternatively, if a user or the application must sent the file quickly, the controller may determine that the large file should be sent across multiple networks simultaneously. In one instance this may include a home or enterprise WiFi network and a neighbor's home or enterprise WiFi networks or on an LTE network.

Controller for Broadcast Send of Files to Mobile Devices: In crowded environments, often many devices may be requesting similar files from network servers. In these instances and others, a network box, access point, or even mobile device may function as a controller 500 to enable broadcast of repetitive traffic to multiple devices over the same communication medium. For instance at a sporting event stadium, multiple devices may request statistics or news from a specific sporting website. A controller in communication with the local wireless tower may choose to send this data to all the wireless devices simultaneously. The mobile devices may cache the data locally for a specified TTL and then if a user of the mobile device requests the content, the content may be served directly from the cached copy already received by the device. This approach may reduce the overuse of wireless channels for repetitive data. The TTL may be dynamically managed based on updates from the website itself or by comparing a difference rating between the last cached copy sent by the tower to the current version on the website. The tower itself may be enabled with storage mediums to store such relevant content.

Multi Network Scanning for Security: Applications may further be enabled to leverage dual network homing to increase their security. Though a connection may be secured with an HTTPS/SSL/TLS or other secure system, certain source, destination data may still be available to parties that are monitoring traffic on the system. Certain secured servers may be accessible only over a home network while other head-end servers or well secured serves may be available over several networks. In such a system two requests may be made by the application to split certain traffic across the network interfaces. Alternatively, traffic may be deemed at a higher security level based on the presence of two separate networks as the location can be better identified. For example, the presence of a Bluetooth connection to an IoT device coffee machine in the office in combination with an enterprise WiFi signal in further combination with GPS may provide a better signal that an individual is actually inside an office building versus trying to connect from an outdoor parking lot. The device and or server upon seeing these three connection parameters may allow access to the network resources beyond simple authentication username/password. Additional biometric security including fingerprint, retinal scan, eye print, body scan, RFID scan may be performed for identification. An API or SDK from the OS or a third party provider may be enabled to expose the full set of network interfaces and which applications to use on which interfaces at which times and specific types of requests. Additionally, virtual IP addresses may be dynamically created between a server and communication device based on a sensitive data request or for a set time period.

Motion Processing and Indoor Location Position to Activate Second Interface

Figure 6:
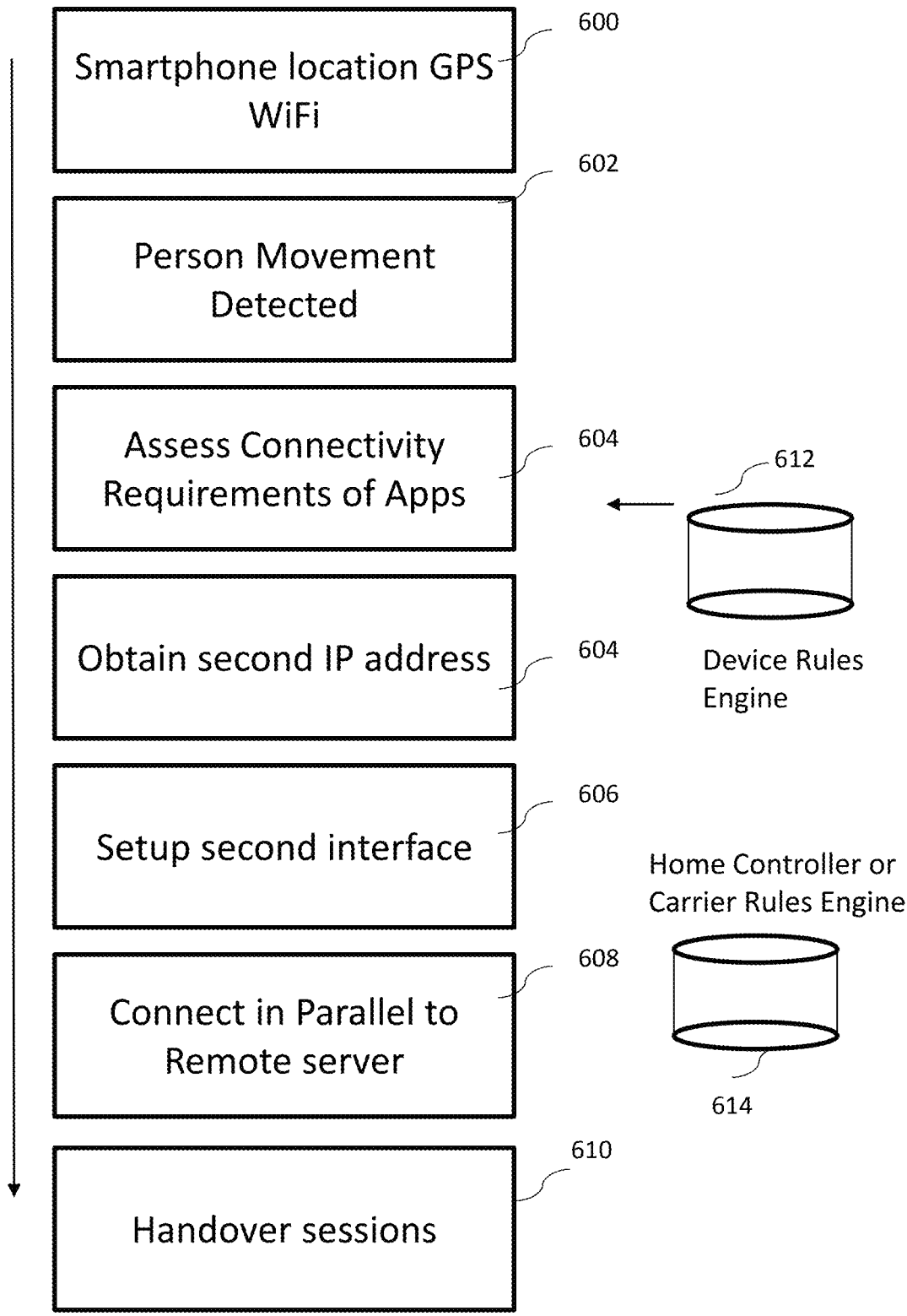
FIG. 6 shows a predictive network action sequence based on a device location and movement.

Referring now to FIG. 6, FIG. 6 depicts a network connectivity system that uses motion data for predictive network actions. In one embodiment, a processor in a mobile device 600 that is enabled to detect motion 602 may be enabled to be change its wireless network configuration based on physical movement behavior. In these instances a wearable device or a commotion processor in the wireless device itself may detect movement 602. Based on this movement and the rate and velocity data if available, the device may then activate a buffering mechanism to ensure reliability of network streams by assessing the current network activity 604. For instance if a smartphone detects movement, then it may wake or activate a previously dormant cellular LTE connection, request a new IP address 604, setup a connection to a server 606, or start buffering data across the cellular network that is currently being accessed by the same device over WiFi. If a user enables a location map of their house, the wireless device may be able to use indoor location data in conjunction with a motion processing to determine when to activate another network interface.

Figure 7:
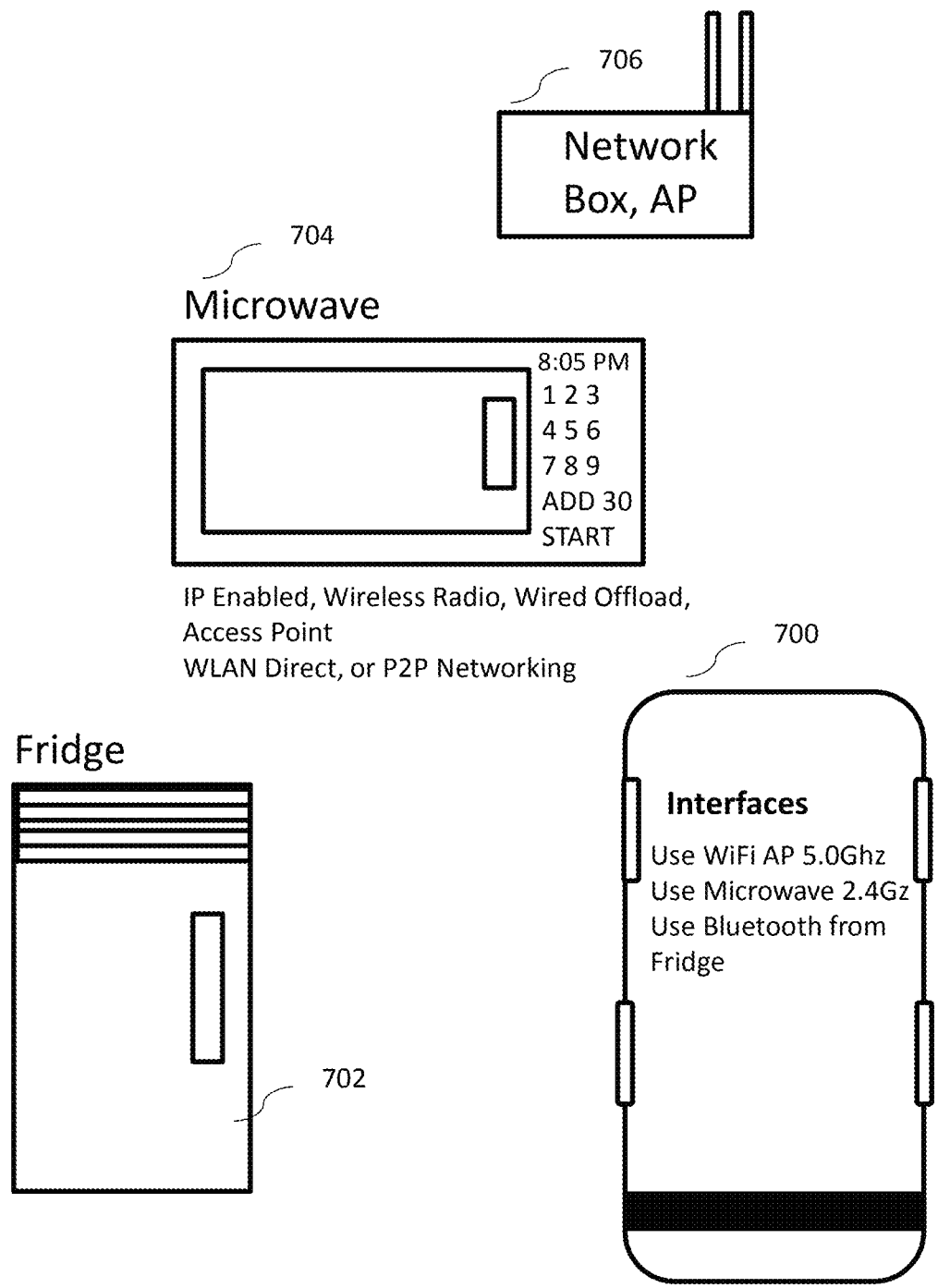
FIG. 7 shows various appliances that are enabled with wired and wireless capabilities to function as access points, repeaters, or wireless offload points.

Leverage Appliances & Streaming for Simultaneous Access and Offload: Referring now to FIG. 7, FIG. 7 shows an embodiment of the present disclosure to enable coordinated communication across various devices across multiple network interfaces. A mobile device 700 or a network switch 706 may be enabled to receive faster communication by the simultaneous use of various appliances accessing wired and wireless networks. For example, a fridge 702 may have a wired interface to a fast Gigabit ethernet network or a lamp may be connected to a power over ethernet network. Alternatively a microwave 704 may function as a separate access point or repeater for a specific location of a house or office.

Still referring to FIG. 7, the IoT devices may be enabled to dynamically offload traffic from wireless to wired more efficiently. As an example, an individual in a living room or office conference room may seek to access a large presentation. The local IoT device 702, 704 may be brought into the loop to function as the access point to receive a connection request from the mobile device and to access the request over a wired network. The IoT 702, 704 devices may then use a hyper local communication medium such as Bluetooth, IR, or other factor to send the data to the device. This may enable spectrum conservation by moving more traffic over wired networks and hyperlocal wireless networks versus an overused WiFi system.

Figure 8:
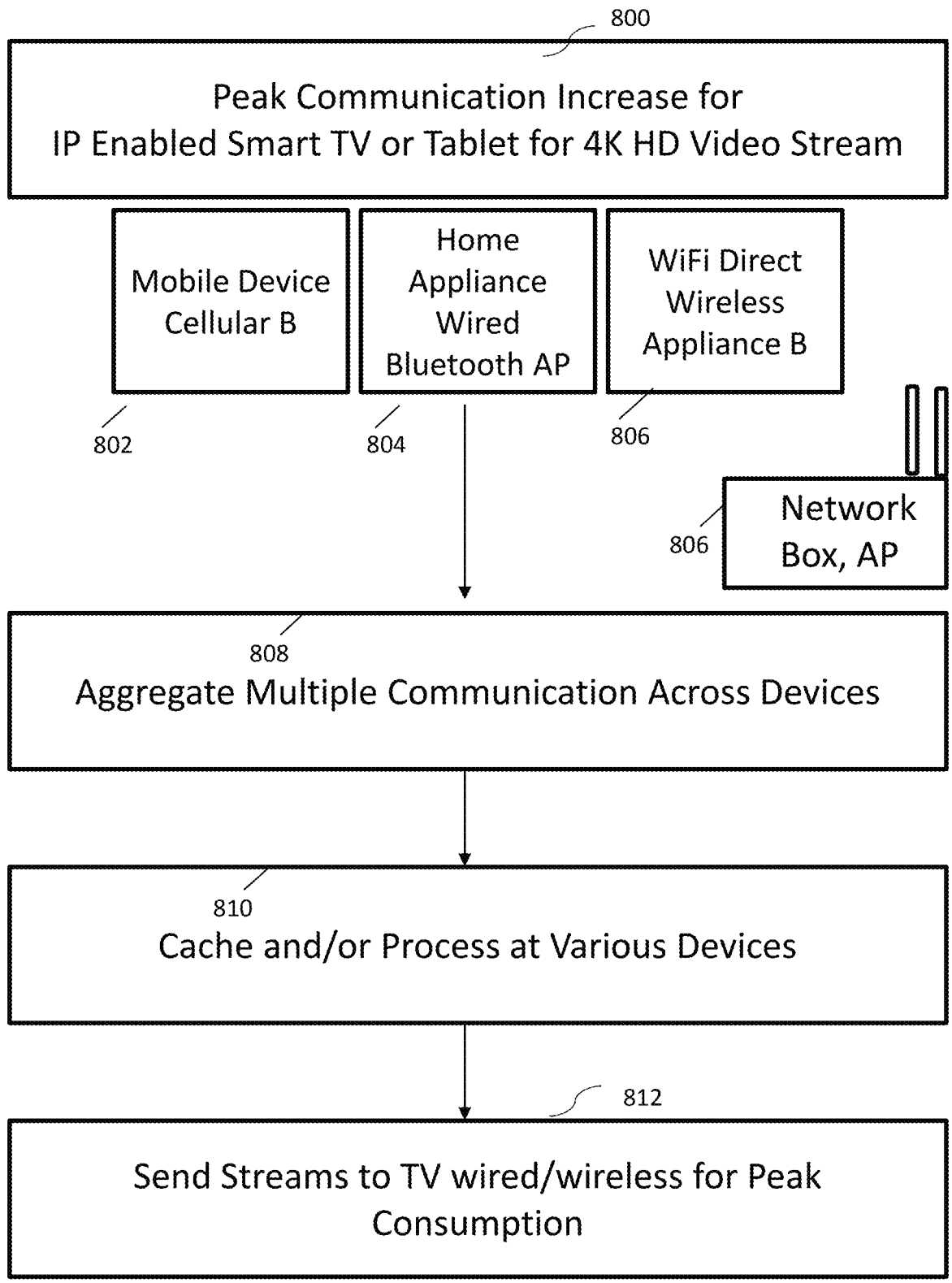
FIG. 8 shows a system to download large content files using multiple spectrums and multiple devices.

Referring now to FIG. 8, FIG. 8 depicts a coordinated system of various home appliances in conjunction with a mobile device and network access point to stream large files. These devices may also be enabled with various hyper local, local, Wifi, WLAN, or cellular wireless connectivity options. In this example, a device such as a tablet or set top box TV may seek to download a large stream such as a 4K HD video stream 800. The device may query a local, network, carrier, or home server or controller device to discover other nearby resources that can aid in downloading the large file. These devices may also be discovered using a peer to peer discover mechanism. In this instance a separate mobile device 802, home appliances such as a fridge 804, thermostat, lighting device, or another appliance 806 may all be enabled with wireless or wired capabilities. A virtual network interface may be created across a plurality of devices. In the above instance, the virtual network interface may be created by a plurality of any one of the devices such as a plurality of smartphones or tablet computer or appliances. This virtual network interface 808 comprised of several device's own network interfaces may be assigned a specific IP address. The various devices may subsequently start downloading files from a remote server such as media content server.

Still referring to FIG. 8, a peer to peer negotiating method or a local controller or network controller may be enabled to coordinate traffic peering across the devices. As an example, a Set Top Box or TV (Video Device) may download various content from a remote server. The Video Device may be connected to a wired network box or a plurality of wireless devices or IoT devices 804, 806. These IoT 804, 806 devices or other home appliances may download content on behalf of the TV from the remote server and store the content locally or transmit the content to the TV for local processing. As an example, the fridge may download a first part of the movie, while a dishwasher may download a second set of frames. These devices may store the data or transmit it to a local home caching server or transmit it directly to the TV to buffer and present on the display 800. Alternatively, if the access point or network box is full capable this device 806 may use wired connections over wireless connections to remove the network clog from the wireless traffic zones.

Figure 9:
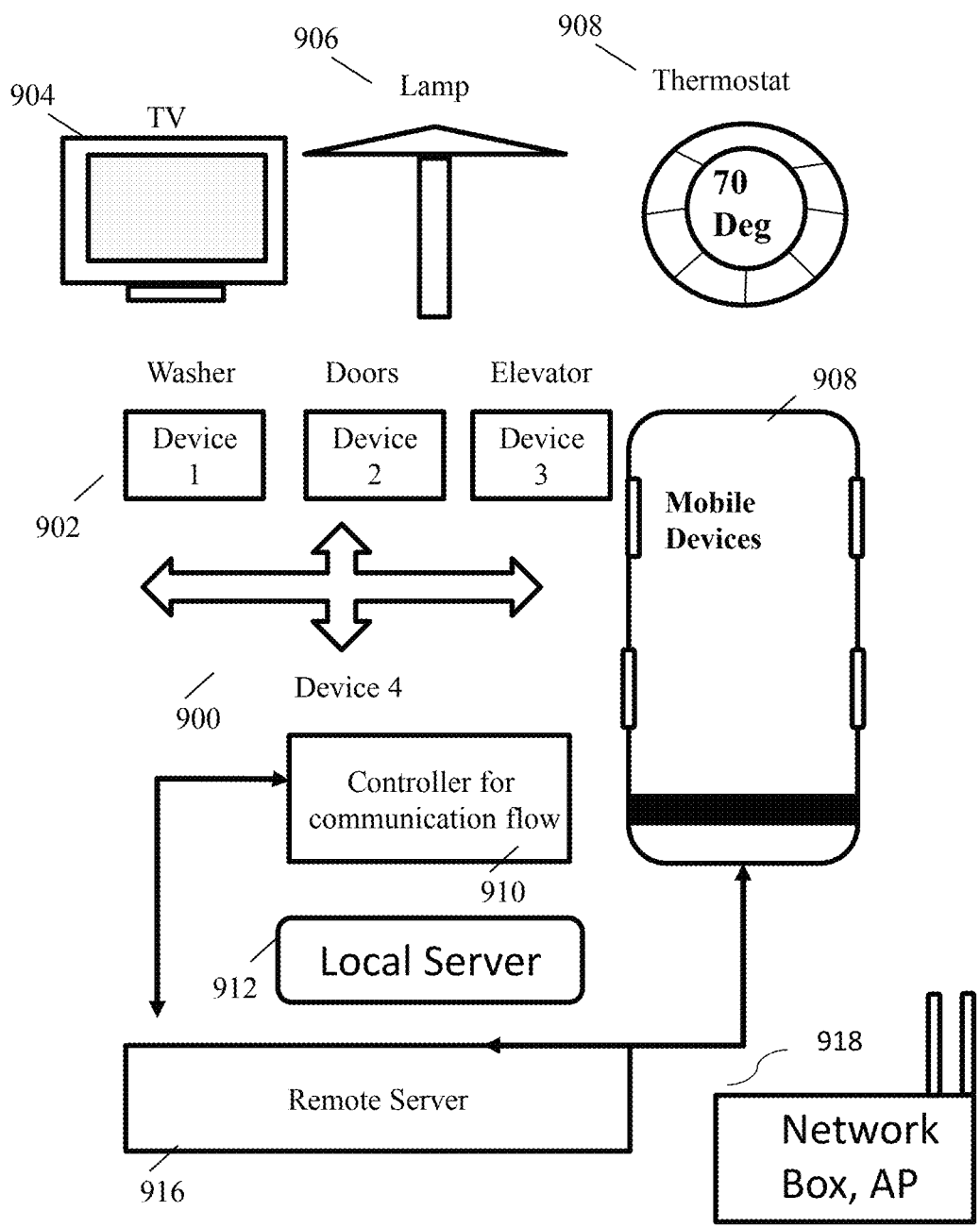
FIG. 9 shows a mesh network useful for an adhoc network of home appliances.

Referring now to FIG. 9, FIG. 9 depicts a home, office, and mesh network made up of a plurality of internet enabled appliances 902 and a mobile devices are enabled in a mesh network. The mesh network can allow for multiple devices to transmit and receive data to one another using a peer to peer network. This network communication may be based on WiFi Direct, WLAN communication, broadcast, multicast, Bluetooth LE, Zigbee, or other mechanisms. These devices may be enabled to communicate locally with one or via a headend controller like device 910. A server 912 may run the controller software 910 or they devices may be separate. In order to conserve spectrum the controller 910 may dynamically set a policy for appliances to communicate in a mesh network or with an access point 918. The access point may be reserved for certain priority traffic communication such as that with the TV 904 which may need 2.4 GHz or 5.0 GHz communication. Various other devices such as the lamp 906 and thermostat 908 may which to directly communicate with one another. It may not be critical that all the other devices on the network observe this traffic. These two devices can communicate on power over ethernet or a local medium meanwhile a controller may be receive the communication on a wired network. In yet another aspect, an elevator may be configured with WLAN and cellular connectivity as a local cell tower to keep session continuity in the elevator as a device roams from tower to tower.

In various instances priority associated with traffic may be indicated. Various devices including appliances mobile devices, smartphones, switches, access points and other devices may function as storage mediums to temporarily store data that can be synchronized at a later point when network access is more available. In various instances, emergency, health, or video streaming data may receive a higher priority whereas reporting sensor data may receive a lower priority. These priority levels may influence the manner in which transmit and receive occurs but they also may allow storage of lower priority information across a mesh network or across a forwarding packet. In this instance, forwarding decisions by an SDN or networking controller may incorporate network characteristics, storage characterizes from public and private clouds, and compute characteristics to the extent that security compression or other tools are needed for packet and data processing.

Still referring to FIG. 9, it is aspect of the disclosure to enable multiple devices to create one network virtual interface to download large files. These devices may each download parts of a file and the various parts of the file may be reassembled by a local or network server. In this instance, appliances 902, 906, and 908 may deliver the content to a local TV device 904 in the same room wirelessly over a certain frequency. Meanwhile the server or controller may be communicate with a remote server 916 to access remote content over the wired network.

Still referring to FIG. 9, a lamp or other light emitting device which is smaller in shape may be used to further communicate data to a nearby device. This may reduce the need to consume wireless spectrum. The light emitting diode may have a sender and corresponding receiver on the other end. In this instance traffic from the wireless network may be offloaded to a light night network. In yet another instance, traffic need not even be sent on the wireless network and instead may be retained solely on a light based network. Infrared may further be used to communicate data between devices.

Still referring to FIG. 9, in yet another aspect of the disclosure, multiple devices may join together to create a local access point or cellular point. In this case, a set of appliances can broadcast a joint SSID and act as a network access point for local area network devices. This can create hyperlocal cellular points. These micro environments may use WLAN communications or hyperlocal communication mediums with a WiFi or Bluetooth protocol to route for example local and cellular data transmit and receive.

Figure 10:
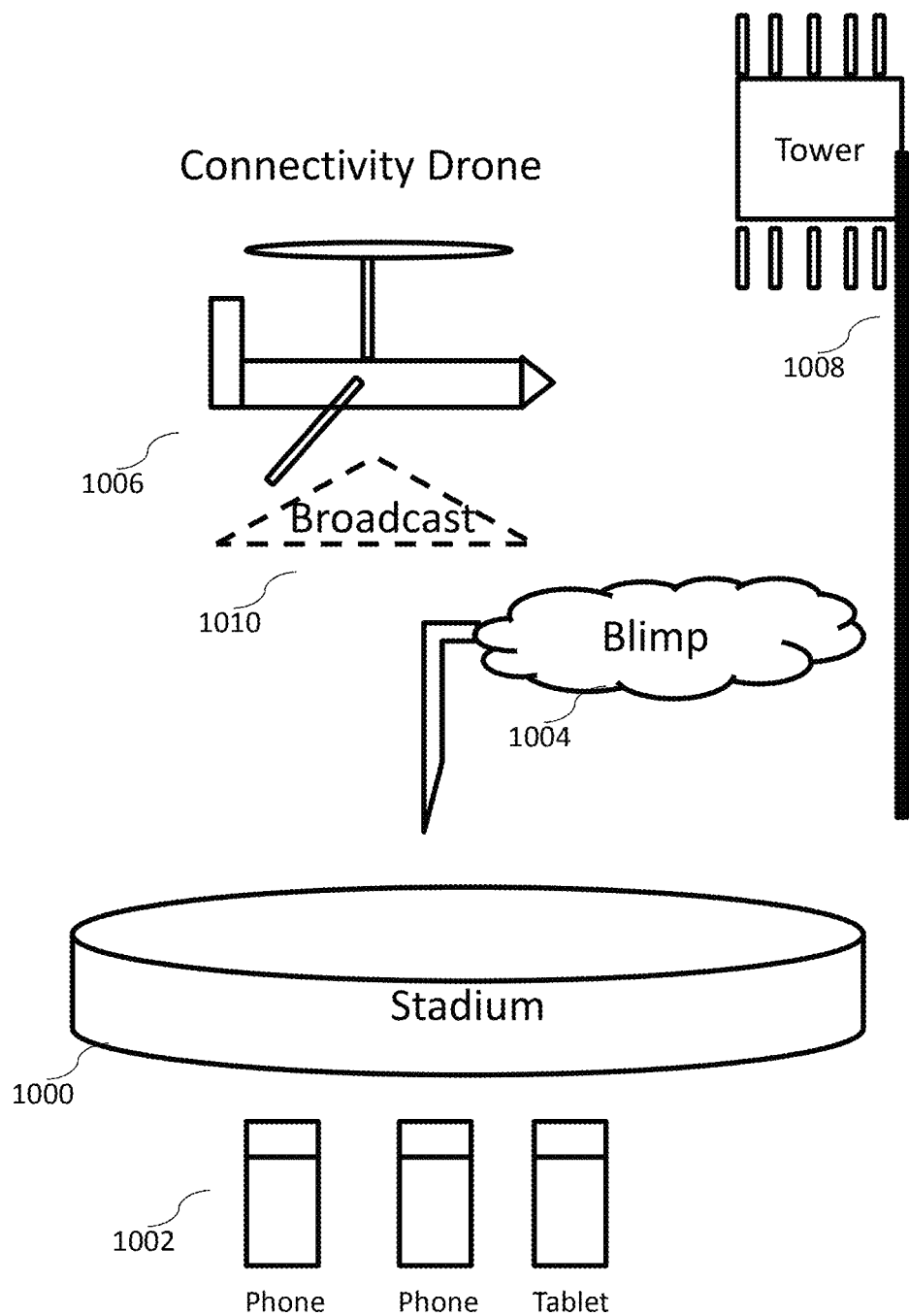
FIG. 10 shows a stadium event that enables greater coverage of wireless phones through the use of temporary drones, blimps, aerial vehicles, and terrestrial towers, and cars.

Referring now to FIG. 10, it is an aspect of the disclosure to enable enhanced coverage during large events including stadiums 1000. Various devices including drones, blimps 1004, and towers 1008 may be enabled with several antenna arrays including 4×4, 8×8, and 16+ coupled to radio frequency transmit and receive units to enable better coverage for a specific location. This coverage may be dynamically increased based on the attendance of individuals at an event. As coverage diminishes, a server for a carrier or other network may deploy more drones to provide greater network and wireless coverage. Alternatively, stadium works may deploy more access points to offload wireless traffic. These devices may be enabled with various priority levels to enable the enhanced coverage based on the dynamic network flows. Various devices may further be enabled for broadcast communication over one or more frequency bands such as the drone 1006 may be enabled to broadcast content 1010 to subscribing wireless devices 1002. This can allow greater distribution of content at the same time. The drone 1006 or blimp may be enabled to use directional antennas in combination with a broadcast signal to share content more efficient to communication devices in the stadium or location.

Figure 11:
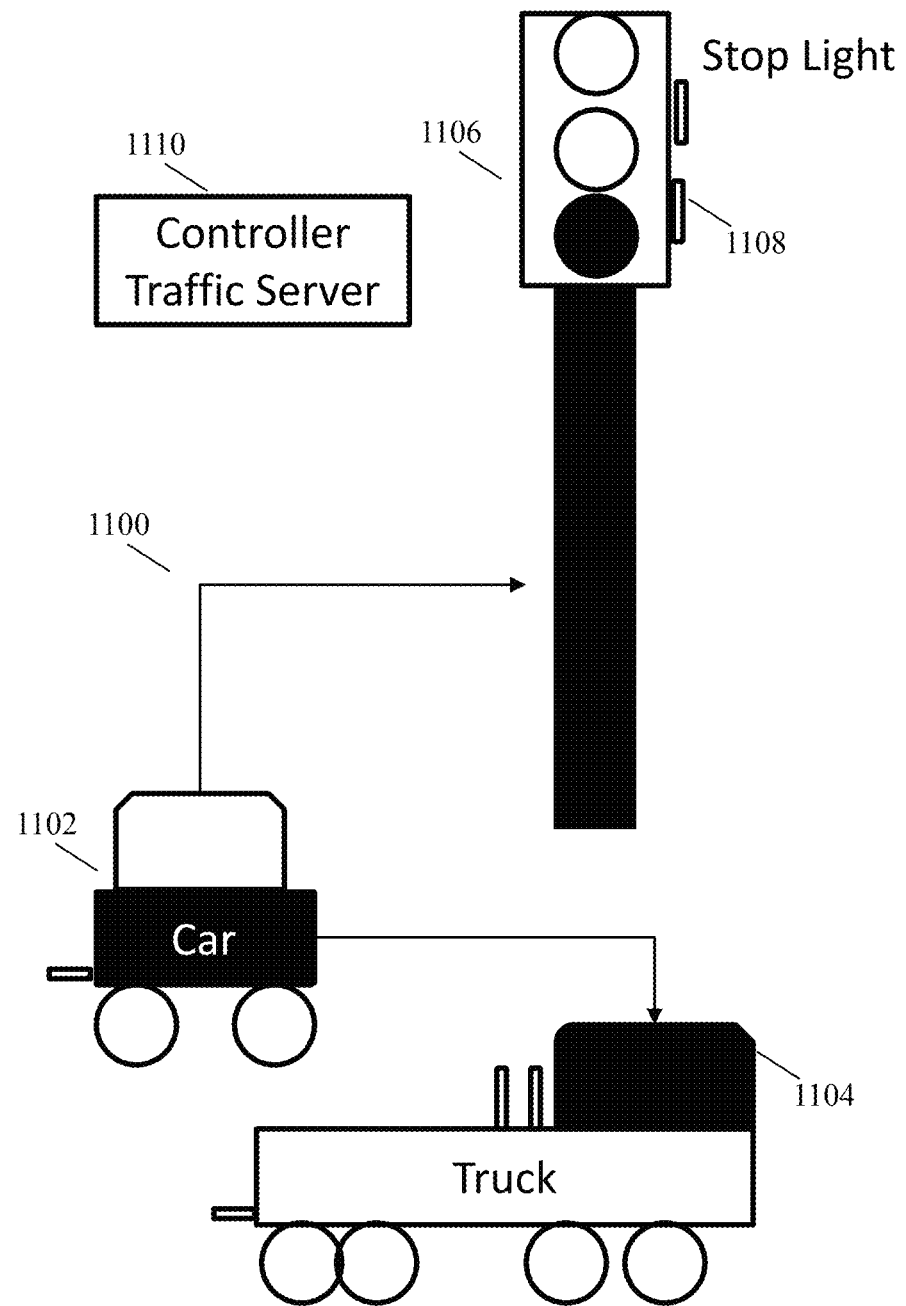
FIG. 11 shows a connectivity network of moving devices including cars, trucks and stop lights in communication with each other.

Referring now to FIG. 11, FIG. 11 depicts a network 1100 with communication between vehicles 1102, 1104, and communication between vehicles and stationary infrastructure such as a stop light 1106 enabled with a plurality of antennas 1108 and transmit and receive components. The vehicles may take actions or present data based on the communication between vehicles. A server 1110 may be embedded in each vehicle along with a controller, a processor, a storage memory, and software algorithms. In other instances, the devices may receive less time critical information for example from a traffic server located locally or remotely. The vehicles may be enabled with millimeter wave length communication, WiFi, WLAN, and cellular connectivity. These devices may be enabled to signal one another to describe lane changes, intended movements, potential hazards or likelihood of a crash. This information can enable the vehicles to take corrective action. Additional less time sensitive information may be broadcast via WiFi or cellular to other devices on other observations including road conditions or traffic. The vehicles in unison may act as a local cellular network pooling their network transmit and receive functions to provide cellular coverage to passengers in the cars using mobile devices. These devices may have varying levels of network connectivity requirements. Travelling vehicles can join an overlay network so that if another vehicle is in the vicinity and has excess network capacity they can share it with local members. In one embodiment a first vehicle can receive a stream over a local wireless network from a second vehicle where the second vehicle has received the data from a cellular network. The first vehicle may not have a strong carrier signal or can also use its carrier signal. The first vehicle or a mobile device in the first vehicle can combine the data streams into one flow.

Still referring to FIG. 11, the vehicles may be autonomous self-driving vehicles which form a self-driving unit. The unit itself may send commands around how to drive in unison such that a car in front breaking would cause the car behind it to also break. These cars may use millimeter wave length communication to signal quickly. Alternatively, they may use a synchronized server to guide the driving in which case commands are not sent from car to car but instead sent from car to server and server to car.

Figure 12:
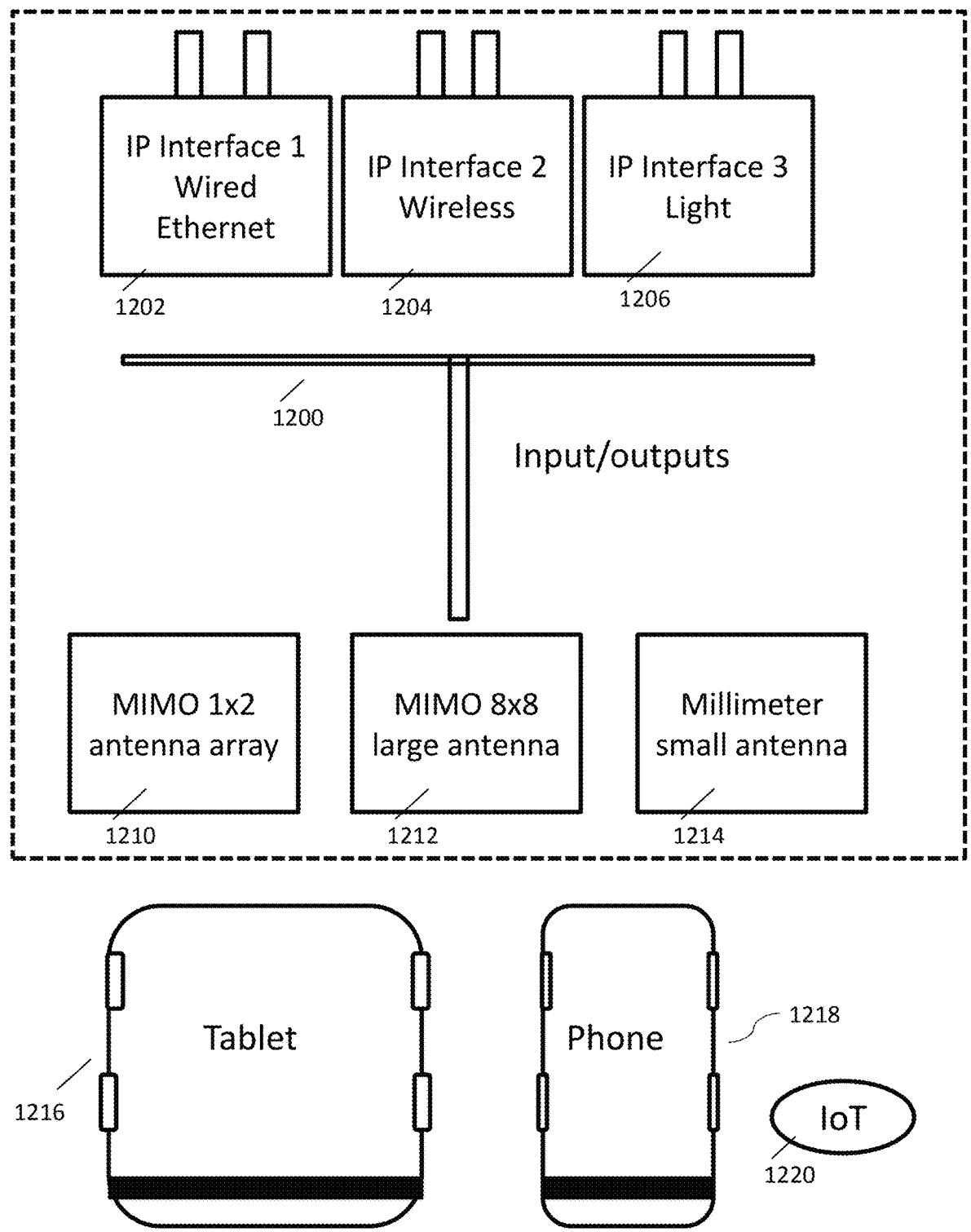
FIG. 12 shows a set of virtual interfaces made up of physical signal streams and ip interfaces across 1 to n devices.

Referring now to FIG. 12, FIG. 12 depicts various virtualized interfaces in one or more devices. Various Internet Protocol enabled interfaces with one or more ip addresses maybe enabled on a device. These interfaces may be coupled to a specific underlying signal stream component such as a ethernet port or a wireless port or virtual software enabled ports like port 80 http, 443 ssl, VPN ports and so forth. Alternatively, the interfaces may be virtual interfaces enabled to communicate over a non physical connection. Various different antenna arrays may be used such as 1210, 1212, and 1214 that may communicate at different frequencies wherein multiple antennas may be used selectively for uplink or downlink transmissions. Additionally, data transfer may split over various frequency bands simultaneously so that part of a data stream is split into different bands for sending at the physical wireless level. These wireless capabilities may be virtualized to enable seamless wireless interfaces to an IP controller or interface 1202.

Intelligent Switching: The system may further be enabled for intelligent switching such that certain interfaces are dynamically enabled. The switching infrastructure may be embedded into the mobile device or communication device. The switch may work in conjunction with a local controller or network controller. In these instances, the switch may forward packets based on the grouping of wireless interfaces at the IP or signal stream level.

The switch may determine that a device with a capability to join several frequency bands may allow for faster packet forwarding that a traditional network switch box. In these instances, the mobile devices themselves may become packet forwarders or switches on the network.

In other instances a device may run a virtual machine for a consumer mode and a separate virtual machine for an enterprise mode. The routing of traffic may not need to leave the device itself but to enable the device to function or apps to not be aware of the separate virtual machines within the device, the communication may need to flow across a virtual network interface from one VM to another VM within the same server or mobile device. Each application on the mobile device may itself act in a virtual machine container. Switches themselves may be enabled with various virtual machines such that the switch can route traffic within the switch and to an appropriate virtual machine.

The system for packet forwarding may be based on a learning method or collaborative filtering approach. Alternatively, packets may further be encapsulated with a simple tag for wireless hops or shorter distances. As an example a forward between two mobile devices and an access point may simply have two to three tags at the front of the packet. The access point which may have more compute and energy capability may strip out these tags and use a full header which includes more QoS and descriptive information.

It is an aspect to enable widespread passive IoT 1220 devices in distributed outdoor and indoor environments that may use RFID to send data to nearby devices or hyperlocal wireless communication or Bluetooth LE or light or sound including non human audible sound to communicate. These device may create mesh networks to forward packets with each other.

The foregoing description of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure, and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

APPENDIX TO SPECIFICATION

Contained herein are various appendix materials to the specification.

It is an aspect of the disclosure to enable an application server to catalog and track APIs in use by the wireless devices.

It is an aspect of the present disclosure to enable various higher layer APIs and communication using REST, libraries, javascript, python, JSON, Ruby, objective c, Java, C++, or other languages. Various application layer protocols may further be used including SMTP, HTTP, HTTPS, GET/POST activities. Various routing and networking including open shortest first path, BGP, MPLS, and others.

The switching system may enable dedicated and undedicated circuits and use a mix of session continuity data and unreliable non session continuity data for failover, backup, or predictive caching of future information.

It is an aspect of the present disclosure to record and track the state of various connections over time. Each session may be in a finite or infinite state and these sessions may be tracked by a server in a cloud.

The cloud systems of the present disclosure may be distributed across large geographic regions so as to provide coverage to various mobile devices.

It is an aspect of the present disclosure to enable reporting and various analytics around the mobile devices usage of data in a network and their consumption of data during peak bandwidth periods.

It is an aspect of the present disclosure to enable various network devices including network filters and network spoofing agents.

It is an aspect of the present disclosure to enable switch and routing based on customer relationship data from a CRM system and server. In various embodiments, traffic of high important customers, premier accounts, or paid accounts may receive a better quality of service. The QoS indicator may be determined by a scoring algorithm or other measure received via an application programming interface (API) from a CRM system.

It is an aspect of the present disclosure to enable various activity feeds and social feeds of devices to be communicated in real time or stored for future archival from IoT and sensor devices.

It is an aspect of the present disclosure to enable various devices to route traffic based on a completion setting in which traffic communication from one node to another node is based on whether the entire request was completed. In these various instances, routing, forwarding and switching may not be based on specific TCP/IP session goals. Instead they may be based on an application goal. Application goals may be set by developers according to a rules engine.

The goals of the application may be based on a user, a device, a network congestion rating, or other factor. In various instances, the goals of an application may be to have a seamless streaming experience, to enable pre-fetching of extra video content based on a predictive algorithm, to enable failover or redundancy in connectivity, to enable a higher level of caching at a local device for future forwarding, and so forth.

For example, a device which may be out of battery shortly may choose to have a goal of sync all the content of its device as quickly to several other local devices before it powers down. In this instance the device may use various frequencies or a lower power frequency to deliver the content. The content may then be stored across a set of network devices which may over time slowly or quickly synchronize the content with a cloud based system.

What is claimed is:

1. A system comprising:
a network enabled device configured to communicate a plurality of content to a mobile device as plurality of streams;
a controller configured to instruct the network enabled device to communicate the plurality of streams to reduce the latency of at least part of the communication of the plurality of streams;
wherein the network enabled device is configured to utilize both TCP and an unreliable transport protocol to communicate the plurality of streams to the mobile device; and
wherein the mobile device is configured to utilize at least part of the plurality of streams received in part by TCP and in part by the unreliable transport protocol to generate the plurality of content at the mobile device.

2. The system of claim 1, wherein a quality of service indicator is associated to a video stream.

3. The system of claim 2, wherein based on the quality of service, the network enabled device transmits the video stream on a higher and lower frequency.

4. The system of claim 1, wherein the network enabled device provides the plurality of streams such that a second data stream includes redundancy data comprising data of a video stream.

5. The system of claim 1, wherein at least one of a plurality of separate wireless devices caches a data and transmits said data to the mobile device via a mesh network.

6. A system comprising:
a network device configured to communicate a plurality of content to a device;
the network device configured to communicate the plurality of content to the device over a plurality of streams;
wherein the network device is configured to utilize both transmission control protocol (TCP) and an unreliable protocol to communicate the plurality of streams to the device; wherein the network device reduces the latency of the communication of at least part of the plurality of streams by utilizing multiple protocols in communication to the device; and
wherein the device is configured to utilize at least one of the plurality of streams received by TCP and at least one of the plurality of streams received by the unreliable protocol to create a version of the plurality of content accessible by the device.

7. The system of claim 6, wherein the plurality of content is a video stream; and wherein a quality of service indicator is associated to the video stream.

8. The system of claim 7, wherein based on the quality of service, the network device transmits the video stream on a higher frequency and a lower frequency simultaneously.

9. The system of claim 6, wherein the network device communicates the plurality of streams such that a second data stream includes redundancy data comprising of data of the video stream.

10. The system of claim 6, wherein the device receives the plurality of content as a data and transmits said data to a mobile device via a mesh network.

11. The system of claim 6, wherein latency of communicating the plurality of streams is decreased by the use of a predictive algorithm to enable automatically pre-streaming and downloading the content.

12. The system of claim 6, wherein at least one of the plurality of streams is encapsulated in a second one of the plurality of streams.

13. The system of claim 6, wherein the unreliable protocol is UDP.

14. The system of claim 1, wherein the unreliable transport protocol is UDP.

* * * * *